United States Patent [19]

Kondo

[11] Patent Number: 4,910,600
[45] Date of Patent: Mar. 20, 1990

[54] IMAGE PICKUP APPARATUS

[75] Inventor: Makoto Kondo, Kanagawa, Japan

[73] Assignee: Canon Kabushiki Kaisha, Tokyo, Japan

[21] Appl. No.: 248,801

[22] Filed: Sep. 23, 1988

[30] Foreign Application Priority Data

Oct. 2, 1987 [JP] Japan .............................. 62-247942

[51] Int. Cl.$^4$ ............................................ H04N 5/238
[52] U.S. Cl. ...................................... 358/228; 358/909
[58] Field of Search ................. 358/213.26, 213.19, 358/909, 228, 213.22, 342

[56] References Cited

U.S. PATENT DOCUMENTS

| 4,558,368 | 12/1985 | Aoki et al. | 358/909 |
|---|---|---|---|
| 4,663,669 | 5/1987 | Kinoshita et al. | 358/213.19 |
| 4,689,686 | 8/1987 | Hashimoto et al. | 358/213.26 |
| 4,714,963 | 12/1987 | Vogel | 358/909 |
| 4,774,564 | 9/1987 | Konishi | 358/909 |
| 4,800,448 | 9/1987 | Kaneko et al. | 358/342 |

Primary Examiner—Jin F. Ng
Assistant Examiner—Stephen Brinich
Attorney, Agent, or Firm—Robin, Blecker, Daley & Driscoll

[57] ABSTRACT

An image pickup apparatus for picking up an image in accordance with an exposure constant operating with selection of a first recording mode for performing frame recording of the picked-up image and a second recording mode for performing field recording of the picked-up image and comprising a selecting circuit for selecting one of the first recording mode and the second recording mode prior to picking up the image and an exposure constant setting circuit for setting a predetermined exposure constant to the selected recording mode, wherein the aforesaid exposure constant is a shutter time and an aperture determined depending on the brightness of an object to be photographed, whereby in the first mode, the exposure constant is set so that the aperture is fixed and the shutter time is made changeable in accordance with the brightness, while in the second mode, the exposure constant is set so that the shutter time is fixed, and the aperture is made changeable in accordance with the brightness.

16 Claims, 9 Drawing Sheets

| A/D-CONVERTED LIGHT MEASURING DATA (BV) | FOR FRAME RECORDING (BIT 9=0) AV(BIT=0) TV(BIT=1) | FOR FIELD RECORDING (BIT 9=1) AV(BIT=0) TV(BIT=1) |
|---|---|---|
| 00000 000 | 00001 000   00100 000 | 00001 000   00101 000 |
| 00000 001 | 00001 000   00100 001 | 00001 000   00101 001 |
| 00000 010 | 00001 000   00100 010 | 00001 000   00101 010 |
| 00000 011 | 00001 000   00100 011 | 00001 000   00101 011 |
| 00001 110 | 00001 000   00101 110 | 00001 000   00110 110 |
| 00001 111 | 00001 000   00101 111 | 00001 000   00110 111 |
| 00010 000 | 00001 000   00110 000 | 00001 000   00111 000 |
| 00010 001 | 00001 001   00110 000 | 00001 000   00111 001 |
| 00010 010 | 00001 010   00110 000 | 00001 000   00111 010 |
| 00010 011 | 00001 011   00110 000 | 00001 000   00111 011 |
| 00010 110 | 00001 110   00110 000 | 00001 000   00111 110 |
| 00010 111 | 00001 111   00110 000 | 00001 000   00111 111 |
| 00011 000 | 00010 000   00110 000 | 00001 000   01000 000 |
| 00011 001 | 00010 001   00110 000 | 00001 001   01000 000 |
| 00011 010 | 00010 010   00110 000 | 00001 001   01000 001 |
| 00011 011 | 00010 011   00110 000 | 00001 010   01000 001 |
| 00011 100 | 00010 100   00110 000 | 00001 011   01000 001 |
| 00011 101 | 00010 101   00110 000 | 00001 100   01000 001 |
| 00011 110 | 00010 110   00110 000 | 00001 100   01000 010 |
| 00100 110 | 00011 110   00110 000 | 00010 010   01000 100 |
| 00100 111 | 00011 111   00110 000 | 00010 011   01000 100 |
| 00101 000 | 00100 000   00110 000 | 00010 011   01000 101 |
| 00101 001 | 00100 000   00110 001 | 00010 100   01000 101 |
| 00101 010 | 00100 001   00110 001 | 00010 101   01000 101 |
| 00101 011 | 00100 001   00110 010 | 00010 101   01000 110 |
| 00101 100 | 00100 001   00110 011 | 00010 110   01000 110 |
| 00101 101 | 00100 001   00110 100 | 00010 111   01000 110 |
| 00101 110 | 00100 010   00110 100 | 00010 111   01000 111 |
| 00101 111 | 00100 010   00110 101 | 00011 000   01000 111 |

IMAGE PICKUP APPARATUS

BACKGROUND OF THE INVENTION

1. Field of the Invention

This invention relates to image pickup apparatus and, more particularly, to image pickup apparatus in which the aperture size and shutter time are determined by the brightness of an object to be photographed.

2. Description of the Related Art

As the image pickup apparatus for converting an object image to an electrical signal, there are known electronic cameras and video cameras. In such apparatus, in general, an exposure constant that is obtained on the basis of information of the object brightness from the light metering circuit to determine the exposure, for example, an aperture size of the lens and a shutter speed, can be set automatically or manually.

In such conventional image pickup apparatus there are many which compute proper aperture information (AV value) and shutter time information (TV value) corresponding to the brightness information by a central processing unit (CPU) and display this information on the display device.

The graphic representation of the relation of these AV and TV values determined from the brightness information is usually called "program line diagram". And, the conventional image pickup apparatus is constructed in such a way that this program line diagram is previously memorized in memory means and the AV value and TV value corresponding to the brightness information obtained from the light metering circuit can be read from the memory means.

Also, conventionally the image pickup apparatus of this kind performs recording of the image information picked up with the thus set aperture and shutter time on a recording medium.

As this recording method, there are known the frame recording method in which the image information of one frame is recorded by division to a plurality of field informations and the field recording method in which the image information of one frame is recorded as field information. In the above-described image pickup apparatus, either the field recording method or the frame recording method is employed.

However, the conventional apparatus may be modified so that the frame recording and field recording are performed by one apparatus component. Nevertheless there was a problem in that even if the shutter time and the aperture value were set on the basis of the brightness information, it was under the same setting condition that the quality of the picked-up image differed between the field recording and the frame recording.

SUMMARY OF THE INVENTION

An object of the present invention is to solve such problem and to provide an image pickup apparatus capable of recording selectively in either of the frame recording mode or the field recording mode and of obtaining a good image quality by making the most of the advantage of each of the above-described modes.

To achieve such an object, in an embodiment of the invention, the image pickup apparatus for picking up an image in response to the exposure constant is characterized in that there are provided first recording means for performing frame recording of a picked-up image, second recording means for performing field recording of a picked-up image, selecting means for selecting one of the first recording means and the second recording means prior to picking up the image, and exposure constant setting means for setting a predetermined exposure constant for the selected recording means.

Thereby, because that one of the first recording means for performing frame recording and the second recording means for performing field recording is selected prior to picking up the image and the exposure constant suited to the selected recording means is set by the setting means. recording can be carried out in either of the frame recording mode or the field recording mode, and an image of good quality can be obtained by making the most of the advantage of each of the above-described recording methods.

Other objects and features of the invention will become apparent from the following written specification and drawings.

BRIEF DESCRIPTION OF THE DRAWINGS

FIG. 5 is a diagram illustrating a table for the program line digram in the embodiment of the invention.

DETAILED DESCRIPTION OF THE PREFERRED EMBODIMENTS

The present invention is next described in detail in connection with the embodiment thereof by reference to the drawings.

Figure 1A:
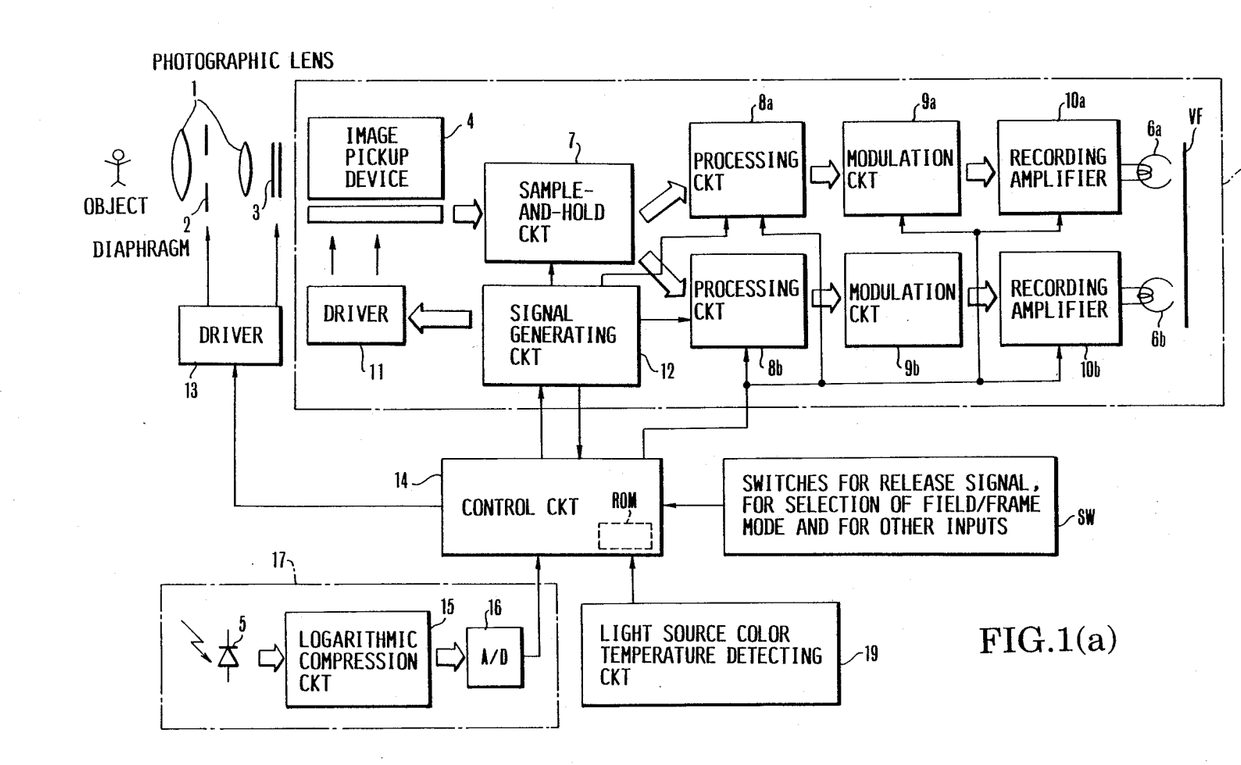
FIG. 1(a) and 1(b) are block diagrams illustrating respectively examples of the arrangement in the embodiments, of the present invention.
Figure 1B:
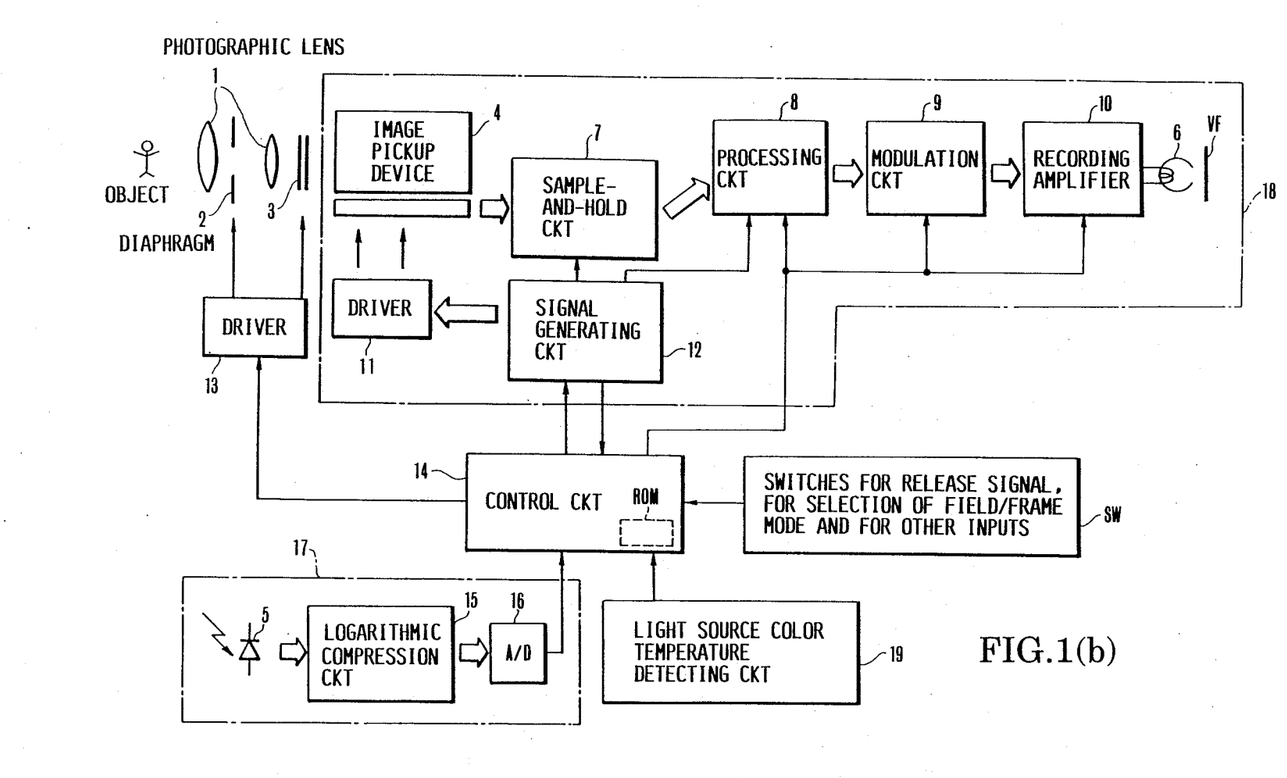

FIGS. 1(a) and 1(b) illustrate respective examples of the arrangement in the embodiments of the invention.

In FIG. 1(a), a photographic lens 1 forms an image of an object to be photographed on an image pickup device 4. A diaphragm 2 adjusts the amount of incident light entering through the photographic lens 1.

3 is a shutter. The image pickup device 4 employs an image pickup element such as MOS, CCD, etc., performing photoelectric conversion of the image. A driver 11 drives the image pickup device 4.

A sample-and-hold circuit 7 samples and holds the output of the image pickup device 4 to allocate the data of this output (color signals) to the first field and the second field.

Processing circuits 8a and 8b each convert the sampled and held color signals of red (R), green (G) and blue (B) to a luminance signal (Y) and color difference signals (C).

Modulation circuits 9a and 9b each modulate the luminance signal and the color difference signals in multiplex. 10a and 10b are amplifiers for recording. Recording heads 6a and 6b each record video signals in field units on a recording medium VF.

A signal generating circuit 12 supplies actuation clocks to the driver 11, the sample-and-hold circuit 7 and the processing circuits 8a and 8b. 13 is a driver for the diaphragm 2 and the shutter 3.

15 is a logarithmic compression circuit for logarithmically compressing the output of the photoelectric converter element 5 in order to find the AV value and TV value. The output of the compression circuit 15 is converted to a digital signal by an analog-to-digital (A/D) converter 16. A controller 14 (control circuit) governs the control of each portion according to the present embodiment. Also, the controller 14 can use a central processing unit (CPU). Again, this controller 14 may be provided with a memory ROM which stores the combination patterns of the aperture and the shutter in each of the frame recording mode and the field recording mode. The photoelectric converter element 5, the compression circuit 15 and the A/D converter 16 constitute a light measuring circuit 17.

18 is a recording portion comprised of the above-described elements. 19 is a color temperature detecting circuit for detecting the color temperature of a light source illuminating the object. Also, SW is a console of various switches.

The operation in the case of recording image information in such arrangement is described below.

When a release signal is input by pushing down a release button (not shown) to indicate an image pickup, the controller 14 activates a video floppy disk drive (not shown) to rotate the recording medium VF at a constant speed. In response to a field/frame changeover signal generated from a field/frame changeover switch (not shown), it selectively sets one of the field recording mode and the frame recording mode in the recording portion.

Further, the controller 14 determines a proper exposure amount (AV value) of the diaphragm 2 and a shutter speed (TV value) of the shutter 3 by the brightness information from the light measuring circuit 17. The controller 14 using the data of the determined AV value and TV value carries out drive control of the diaphragm 2 and the shutter 3 through the driver 13.

As a result, the image formed on the image pickup device 4 is recorded on the recording medium VF by the sample-and-hold circuit 7, the processing circuits 8a and 8b, the modulation circuits 9a and 9b, the recording amplifiers 10a and 10b and the recording heads 6a and 6b.

It should be noted in connection with the recording portion 18 that when the field recording is indicated by the controller 14, the circuits denoted by the numerals 8, 9 and 10 operate at only either one of the subscripts a and b, while when the frame recording is indicated, the circuits denoted by the numerals 8, 9 and 10 operate at both circuits denoted by the subscripts a and b.

Also, in FIG. 1(b), 8 is a processing circuit in which the sampled and held color signals for R, G, B after having been treated by γ conversion, white balance adjustment, etc. are converted to a luminance signal and color difference signals. Also, 9 is a modulation circuit for performing modulation suited to recording. 10 is a recording amplifier; and 6 is a recording head.

In the embodiment of FIG. 1(b), by the driver 11, signals of odd number rows are first read for one field period from the image pickup device 4, and then clearing is carried out. Subsequently, signals of the even number rows are read also for one field period and then clearing is carried out. After that, the shutter is opened for a predetermined period and then closed. Then, again, signals of the odd number rows are read for one field period, and passed through the sample-and-hold circuit 7, the processing circuit 8, the modulation circuit 9, the amplifier 10 and the head 6 to be recorded as the signal of the odd number field in a predetermined area on the medium VF. Upon completion of this, the relative position of the head 6 to the medium VF is shifted. Next, signals of the even number rows are read also for one field period and passed through the circuits 7, 8, 9, 10 and the head 6 to be recorded as the signal of the even number field in another predetermined area on the medium VF. By arranging in such a way, as compared with the arrangement of FIG. 1(a), the differences due to the channel of 8a-10a, 6a and the channel of 8b-10b, 6b do not take place. Moreover, the arrangement can be simplified.

Here considering a difference of the characteristics of the frame recording and the field recording, the frame recording is higher in the resolution for the image to be picked up, but the possible number of frames to be shot per video floppy disk is fewer than in the field recording. The field recording is conversely greater in the possible number of frames to be shot per video floppy disk, but instead lower in the resolution for the image to be picked up.

On account of these characteristics, when frame recording, it is considered desirable to select such aperture values as to make the best use of the high resolution compared to the field recording.

In other words, an aperture range near the full open where the aberrations are relatively large and the depth of field is shallow and another range of small apertures having the influence of stop diffraction are avoided. By using intermediate apertures, an exposure for obtaining the image of good quality by making the most of the above-described high resolution characteristic of the frame recording can be set.

Also, in the case of using the same image pickup element, for the field recording, the sensitivity is higher than for the frame recording by about 1 EV in principle. Therefore, by making the most of this feature, the arrangement is made that the shutter can run at high speeds in order to obtain images of good quality.

Again, this high speed shutter matches the feature of the field recording in which many situations of continuous shooting are encountered with it because the number of frames to be shot per video floppy disk is larger than for the frame recording.

Next, the reason why the sensitivity for the field recording becomes higher by 1 EV than for the frame recording is explained.

Figure 3:
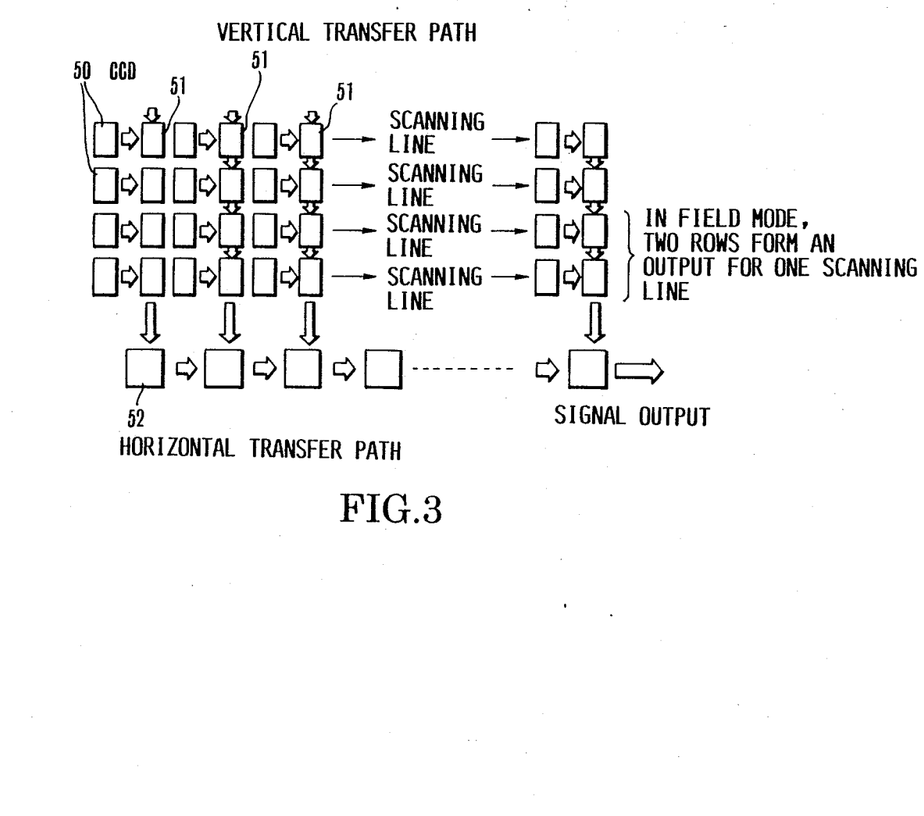
FIG. 3 is a block diagram illustrating an example of the structure of the image pickup device 4 in the embodiment of the invention.

FIG. 3 shows an example of the structure of the image pickup device 4 used in this embodiment.

In FIG. 3, in a case where in the frame recording and the field recording, one image pickup element is used in common, the image pickup element has an equal number of picture element cells 50 in the vertical direction to the number of scanning lines at the time of frame recording. In a case where the field recording is performed by using these cells 50, the image pickup signals (charges) from the cells 50 for two scanning lines are added together, and output as one scanning line from a horizontal transfer path 52. Hence as compared with the frame recording, while the image pickup element 50 is exposed to the object image of the same brightness for the same period, the amount of generated charge per picture element becomes 2 times as high. This means that the sensitivity increases 2 times (1 EV).

Figure 2:
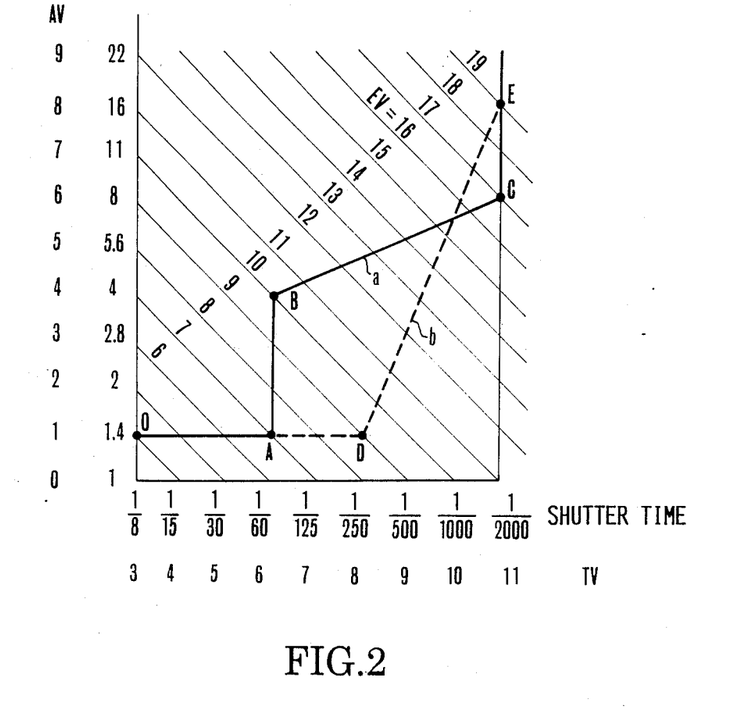
FIG. 2 is a diagram which explains the relation between the aperture and the shutter time in the embodiment of the invention.

The embodiment of the invention made in view of such a reason is described by using the program line diagram of FIG. 2.

A straight line "a" in FIG. 2 is a program line representing the relation between the shutter time and the aperture for use at the time of frame recording. This program straight line is divided into four parts with respect to the object brightness. The first part ranges from a point 0 to a point A, or corresponds to a range of from the total darkness to a brightness value of BV 2, for which the diaphragm is set at full open aperture.

This is because if intermediate aperture values are used, the shutter time would become so long that camera-shake is unavoidable. Since, at the point A, the F-value of the lens is assumed to be 1.4, the shutter time of 1/60 corresponds to BV 2. Incidentally, $Bv+Sv=Av+Tv=Ev$.

Here, the sensitivity of the image pickup element is assumed to be ISO 100 (SV: 5). Next, in a brighter range than the object brightness at the point A or between the point A and the point B, the shutter time is controlled to a constant time (1/60) so long as the above-mentioned intermediate apertures are reached.

In this line diagram shown in FIG. 2, this aperture range in which a best image is obtainable in the case of using the above-described lens is assumed to be F4-F8. For this reason, up to BV 5 at which the F value becomes F4 and the shutter time becomes 1/60, or between the point A and the point B there is set in a range of shutter time priority where the shutter time is determined without relation to the aperture value.

Next, in a brighter range than the point B of F4 in aperture and 1/60 in shutter time (BV 5), the line diagram is made such that a straight line connects the point B to a point C of the highest shutter time of 1/2000 and an aperture of F8. It should be noted that for higher brightnesses than 1/2000, F8 (BV 12), usually because of the impossibility of shortening the shutter time, the aperture only is made to control.

Meanwhile, a straight line "b" shown in FIG. 22 represents the relation between the aperture and the shutter time at the time of field recording.

This straight line is divided into three ranges. These ranges are a full open range from the total darkness of a point 0 to BV 3 of a point D, another range of 1/2000 as constant at the time of higher brightnesses than a point E or BV 13, and a third range of a relatively steep line connecting the point D and the point E.

This program line, as has been mentioned before, by making the most of the advantage that the sensitivity of the field recording is high, is to run the high speed shutter. Incidentally, the sensitivity of the image pickup element at the time of field recording is assumed to be ISO 200 (SV=6).

Figure 4:
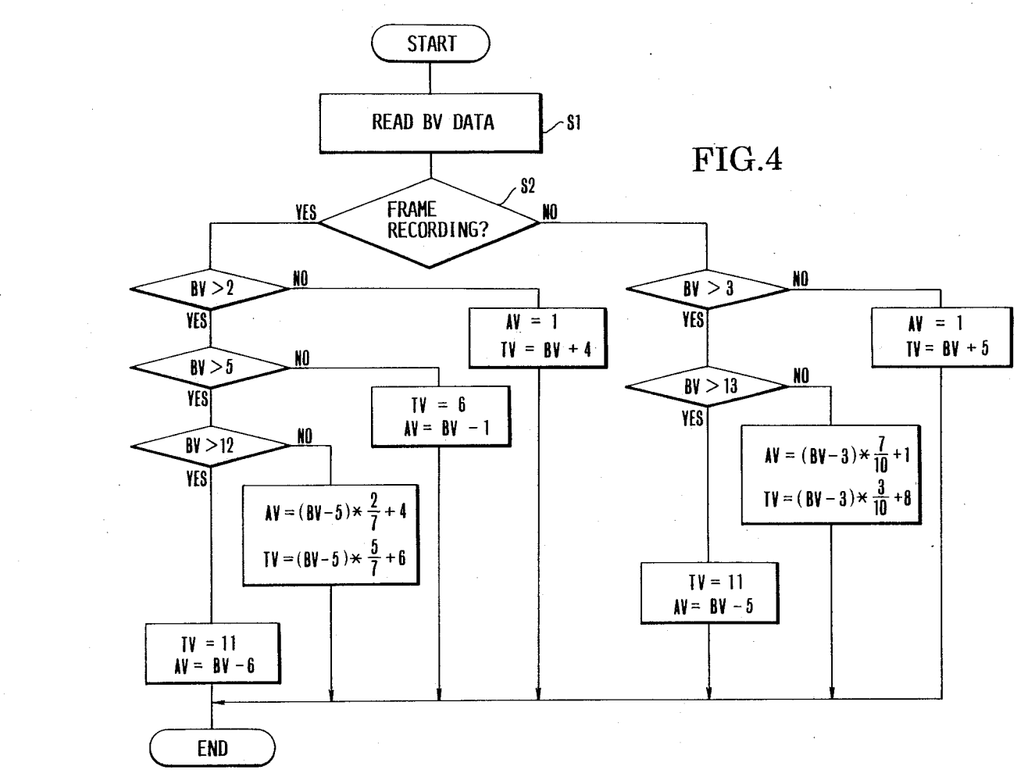
FIG. 4 is a flowchart illustrating an example of the sequence of operations in the embodiment of the invention.

To obtain the combination of AV value and TV value as shown in FIG. 2 from the BV value obtained from the light measuring circuit 17, the AV value and TV value can be determined along such a control process as shown in FIG. 4.

FIG. 4 illustrates an example of the control process for setting the AV value and TV value by the controller 14.

In FIG. 4, after having read the data of BV from the light measuring circuit 17 (step S1), whether the mode of frame recording or the mode of field recording is to operate is judged in a step S2, allocating the subsequent flows. At the time of frame recording mode, the read BV value is compared with BV values "2", "5" and "12". Depending on this comparison result, the AV value and TV value are determined.

It should be noted that the equations for the AV value and TV value shown in FIG. 4 are formulated from the lines "a" and "b" shown in FIG. 2 with the limitations to each region. It is needless to say that these equations may be set properly according to the sensitivity of the image pickup device 4 and other characteristics.

Further, the values to be used for comparison with the BV value, too, may be any appropriate ones, of course. In the field recording mode, similarly by comparing the BV value with "3" and "13", the equations for determining the AV value and TV value and by the BV value are selected. In such a manner, the process for finding the AV value and TV value shown in FIG. 4 is executed by the controller 14, thus making it possible to set a proper aperture and shutter speed in the frame recording/field recording.

Another algorithm for obtaining the line diagram shown in FIG. 2 is next described.

This embodiment is that the AV values and TV values corresponding to the values that the BV value can take are previously calculated, and the AV values and TV values with respect to the BV values are stored in the form of a table on a read only memory (ROM). Thus, the controller 14 is provided with this memory. So, the AV value and TV value corresponding to a BV value produced in a digital form from the light measuring circuit 17 are found out by referring to this ROM.

FIG. 5 illustrates an example of the table content to be memorized in the above-described ROM.

In FIG. 5, the 8-bit data of BV on the left side comprises the most significant five bits representing an integer, and the least significant three bits representing a decimal fraction. And, this BV value becomes an address input of the ROM. The AV and TV values taken as data are expressed by an integer of 5 bits and a decimal fraction of 3 bits.

It should be noted that in this embodiment of the address bits 0-9 of the ROM, the bit 0 is assigned to a signal line for selection of the AV and TV values, and the bit 9 to another signal line for selection of the frame and field recording modes, while the signal of BV value is input to the other 8 bits 1-8 of the address.

Therefore, the AV values and TV values are previously stored in the ROM at the addresses determined by the selection signal for the frame recording and the field recording, the selection signal for the AV value and TV value, and the BV values.

If the ROM in which the data have previously been stored in such a way is used, the controller 14, when the output data of the light measuring circuit 17 and the field/frame changeover signal are input and when the operator indicates selection of either one of the TV value and AV value, operates so that the desired AV value or TV value is obtained from the ROM. Incidentally, even in this embodiment, the TV values and AV values are determined on the assumption that the sensitivity of the image pickup device 4 in the field recording mode has a value equivalent to ISO 200, and in the frame recording mode a value equivalent to ISO 100.

Figure 6:
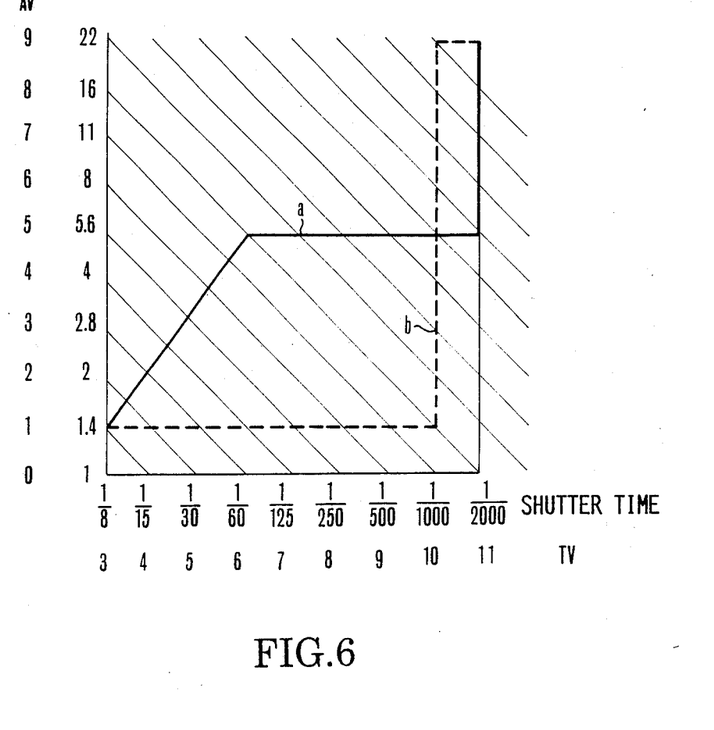
FIG. 6 to FIG. 8 are program line diagrams in the embodiment of the invention.
Figure 7:
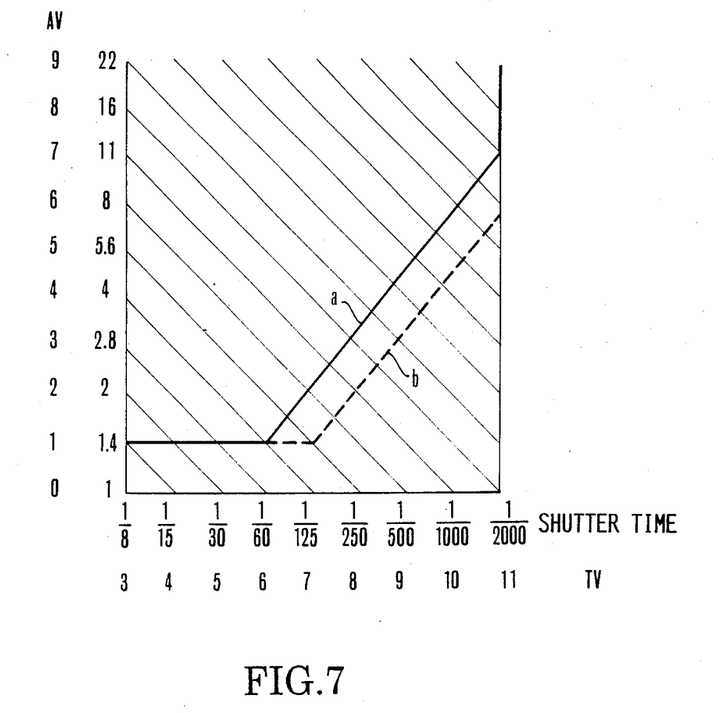
Figure 8:
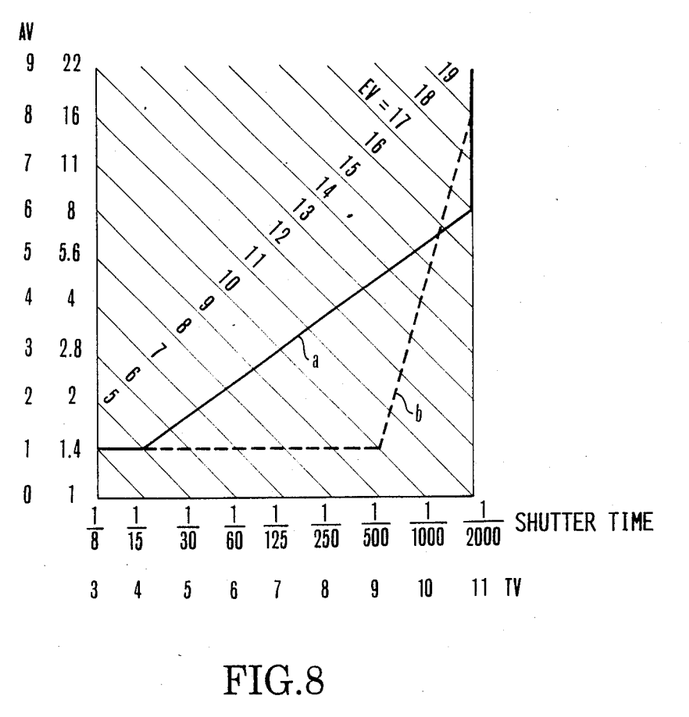

FIG. 6 to FIG. 8 show other practical examples of the relation between the shutter time and the aperture in the invention, in which "a" and "b" each represent the program line diagrams corresponding to the frame recording and the field recording.

The straight lines "a" and "b" shown in FIG. 6 are set so that when frame recording, the aperture priority results, and when field recording, the shutter time priority results.

The straight lines shown in FIGS. 7 and 8, without using complicated line diagrams, represent such program line diagrams that merely the bend point and the gradient are only changed. Particularly the characteristic shown in FIG. 7 is to direct the effect of increasing the sensitivity at the time of field recording only to the result of increasing the speed of the shutter.

Also, though in this embodiment the example having two program line diagrams, one at the time of frame recording and one at the time of field recording, has been shown, it is possible for each of the frame recording and the field recording to have a plurality of program line diagrams which enable the shutter time to be altered by the manipulation of the operator and depending on the full open aperture size, the focal length and other information concerning the lens 1.

Along with this, operating members for changing over the plurality of program straight lines of each of the field/recording and the frame recording by the manual operation can be used in common, of course.

Also, though, to realize the program line diagram, the BV value is analog-to-digital (A/D) converted and digital computation is performed, it is also possible to seek the AV values and TV values by performing addition and subtraction of the analog signal as it stands and by utilizing a counting circuit.

As has been described above, according to the invention, it becomes possible to automatically perform exposure determination by taking into account the characteristics of the frame recording (shooting) and the field recording (shooting). Therefore, an image of good quality resulting from making the most of the respective characteristics can be obtained.

I claim:

1. An image pickup apparatus comprising:
   (a) image pickup means for converting an optical image to an electrical image signal;
   (b) read out means for reading out said electrical image signal from said image pickup means, and having a first mode for reading out said image signal as one field signal and a second mode for reading out said image signal as a plurality of field signals; and
   (c) exposure control means for controlling a shutter and an iris, and changing a combination of a shutter speed value of said shutter and an aperture value of said iris according to said modes in which the exposure control in the respective modes differs in respect of variation of the shutter time and the aperture for the same exposure value.

2. An image pickup apparatus according to claim 1, wherein said read out means adds up a part of said image signal in said first mode.

3. An image pickup apparatus according to claim 1, wherein said plurality of field signals are interlaced with each other in said second mode.

4. An image pickup apparatus according to claim 1, wherein said read out means reads out said plurality of field signals in field order.

5. An image pickup apparatus according to claim 4, further comprising process means for processing said plurality of field signals in field order.

6. An image pickup apparatus according to claim 1, further comprising memory means for memorizing a plurality of combinations of shutter speed value and aperture value.

7. An image pickup apparatus comprising:
   (a) image pickup means for converting an optical image to an electrical image signal;
   (b) read out means for reading out said electrical image signal from said image pickup means, and having a first mode for reading out said image signal as one field signal and a second mode for reading out said image signal as a plurality of field signals;
   (c) memory means for memorizing a plurality of different combinations of a shutter value of a shutter and an aperture value of an iris in relation to said modes in which the exposure control in the respective modes differs in respect of variation of the shutter time and the aperture for the same exposure value; and
   (d) exposure control means for controlling said shutter and said iris based on one of said combination of said shutter speed and said aperture value memorized in said memory means.

8. An image pickup apparatus according to claim 7, wherein said read out means adds up a part of said image signal in said first mode.

9. An image pickup apparatus according to claim 7, wherein said plurality of field signals are interlaced with each other in said second mode.

10. An image pickup apparatus according to claim 7, wherein said read out means reads out said plurality of field signals in field order.

11. An image pickup apparatus according to claim 10, further comprising process means for processing said plurality of field signals in field order.

12. An image pickup apparatus comprising:
    (a) image pickup means for converting an optical image to an electrical image signal;
    (b) read out means for reading out said electrical signal from said image pickup means, and having a first mode for reading out said image signal as one field signal and a second mode for reading out said image signal as a plurality of field signals in field order;
    (c) process means for processing said plurality of field signals in field order; and
    (d) exposure control means for controlling a combination of an image pickup time and an aperture value in accordance with said modes in which the exposure control in the respective nodes differs in respect of variation of the shutter time and the aperture for the same exposure value.

13. An image pickup apparatus according to claim 12, wherein said read out means adds up a part of said image signal in said first mode.

14. An image pickup apparatus according to claim 12, wherein said plurality of field signals are interlaced with each other in said second mode.

15. An image pickup apparatus according to claim 12, further comprising memory means for memorizing a plurality of combinations of said image pickup time and said aperture value.

16. An image pickup apparatus according to claim 12 or 15, further comprising a shutter for controlling said image pickup time.

* * * * *